(No Model.)
L. R. FAUGHT.
DEVICE FOR LUBRICATING LOOSE WHEELS AND PULLEYS.
No. 262,212. Patented Aug. 8, 1882.
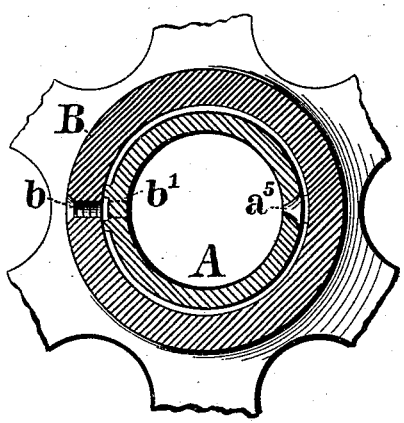
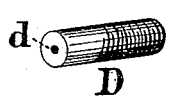
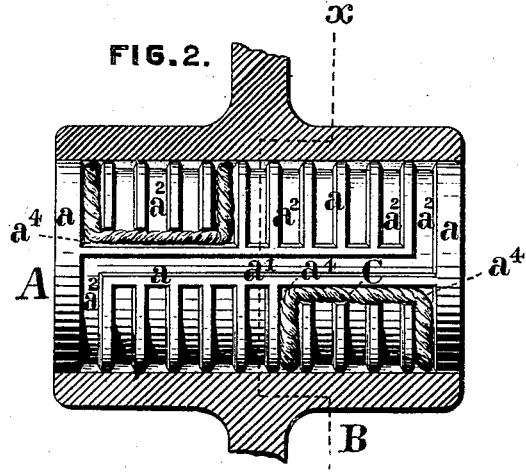
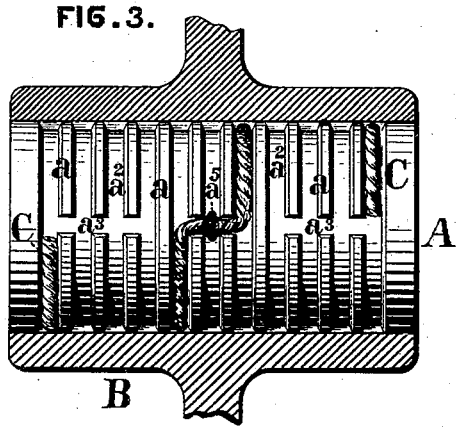
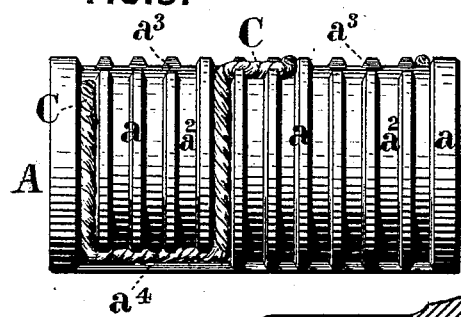
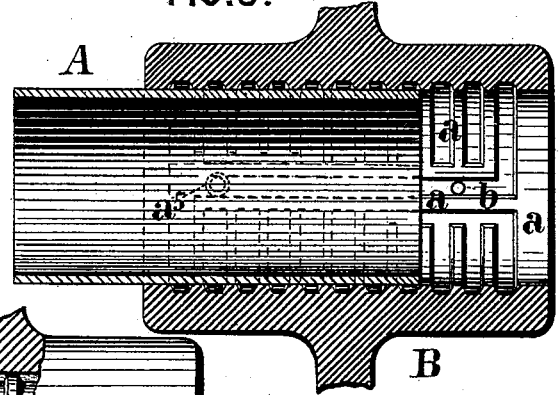
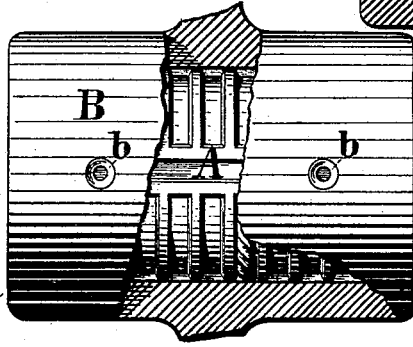
WITNESSES:
N. H. Cenben
Geo. J. Kelly
INVENTOR
L. R. Faught
by Collier & Bell
Attys.

UNITED STATES PATENT OFFICE.

LUTHER R. FAUGHT, OF PHILADELPHIA, PENNSYLVANIA.

DEVICE FOR LUBRICATING LOOSE WHEELS AND PULLEYS.

SPECIFICATION forming part of Letters Patent No. 262,212, dated August 8, 1882.

Application filed July 1, 1882. (No model.)

*To all whom it may concern:*

Be it known that I, LUTHER R. FAUGHT, of the city and county of Philadelphia, in the State of Pennsylvania, have invented certain new and useful Improvements in Devices for Lubricating Loose Wheels and Pulleys, of which improvements the following is a specification.

The object of my invention is to provide convenient and desirable means for supplying the hub of a pulley or wheel which revolves independently of its shaft or axle with a quantity of lubricating material proportionate to the requirements imposed by the duty which it performs, such lubricant to be supplied automatically and continuously, and without waste or escape of the lubricant during the rotation of the pulley, and intermitted during its intervals of rest.

To this end my improvements consist in a cylindrical sleeve or bushing adapted to be secured centrally in the hub of a loose wheel or pulley, and having a series of longitudinal and transverse channels or passages on its periphery communicating with an opening therein; also, in the combination of a loose wheel or pulley, a central cylindrical sleeve or bushing secured therein, and a series of channels or passages interposed between the hub of the wheel and the sleeve, and communicating at different points with openings in the hub and sleeve, respectively. The improvements claimed are hereinafter more fully set forth.

In the operation of machinery of various descriptions it becomes necessary to employ wheels and pulleys which revolve loosely upon and independently of a shaft, which may be either fixed or movable, and considerable difficulty has been experienced in and sundry expedients proposed and essayed for the proper lubrication of revolving members of such character. The practical objections to most of these have been expense and complication in construction, inability to afford a constant and properly-graduated supply of the lubricant, or to arrest the supply when not required, and failure to prevent escape and waste of the lubricant and consequent inconvenience and injury to extraneous objects.

My invention substantially obviates the difficulties above recited, and is of ready adaptation to any of the constructions in ordinary use.

In the accompanying drawings, Figure 1 is a transverse section through the hub of a loose pulley embodying my invention, at the line $xx$ of Fig. 2; Fig. 2, a longitudinal central section, with the bushing in elevation, as seen from the left of Fig. 1; Fig. 3, a similar section, with the bushing in elevation, as seen from the right of Fig. 1; Fig. 4, a view partly in elevation and partly in section of the hub and bushing, as seen from the left of Fig. 1; Fig. 5, a side view, in elevation, of the bushing detached as seen from the top of Fig. 1; Fig. 6, a longitudinal central section through the hub and bushing of a loose pulley, showing a modification of my invention; Fig. 7, a view in perspective of one of the oil-hole plugs, and Fig. 8 a longitudinal central section through the same.

In the practice of my invention I provide a cylindrical sleeve or bushing, A, which is bored out centrally and truly to a diameter such as will permit of its free rotation upon the shaft on which the pulley in which it is to be fitted is mounted. The hub B of the loose wheel or pulley is bored out, and the periphery of the bushing A correspondingly turned off to such diameter that the bushing will enter and fit tightly within the hub. A series of channels or passages is formed upon the sleeve A by partitions $a$, which extend longitudinally and transversely upon its periphery, the diameter of the sleeve over the partitions being uniform throughout and corresponding to the bore of the hub B. The function of the channels or passages is to receive, distribute, and supply lubricating material to the shaft, and their arrangement is substantially as follows: A longitudinal channel, $a'$, extends continuously along one side of the sleeve A from the partition $a$, at one of its ends, to that at the other, and a series of transverse or circumferential channels, $a^2$, encircles the sleeve between said partitions. The transverse channel $a^2$ at one end of the sleeve communicates with the longitudinal channel $a'$ at one side thereof, and the channel $a^2$ at the opposite end of the sleeve communicates with the opposite side of the channel $a'$. The intermediate channels, $a^2$, do not communicate directly with the channel $a'$, but are connected, one with the other, by a series of longitudinal channels, $a^3$, extending, in line one with the other, diametrically opposite the channel $a'$, each of the channels $a^3$ establishing communication between two or more of the channels $a^2$. Upon the opposite side of the sleeve the channels $a^2$ are connected by longitudinal channels $a^4$, which are located on opposite sides, respectively, of the channel $a'$, each of the channels $a^4$ extending from one of the end channels $a^2$ to that which is adjacent to the center of the sleeve. A delivery oil-hole, $a^5$, is drilled through the channel $a^3$, and a supply oil-hole, $b$, (one or more,) is formed in the hub B of the pulley, the sleeve being inserted therein in such position that the supply hole or holes $b$ shall lead into the longitudinal channel $a'$. A wick or flexible cord of fibrous material, C, is led from the delivery oil-hole $a^5$ through each of the adjacent channels $a^2$, and thence through the channels $a^4$ to each of the end channels, $a^2$, terminating therein at or adjacent to the longitudinal channels $a^3$.

The use of two oil-supply holes $b$, I have found convenient in the particular that escape of air through one is permitted while oil is being poured into the other; and while the use of plugs for said holes is not essential to prevent the escape of oil, yet the same may be found desirable to guard against the entrance of dust and other foreign matters.

I have found in practice that the plugs D may be readily and cheaply made of strips of leather, which, after being properly rounded and drawn through a die, as in the manufacture of round leather belting, are cut to the desired length and inserted in the supply-holes, which latter may be threaded by a fine-taper tap. The plugs D may be stiffened by a central core of wire or small brad, $d$, if desired.

In locations where the wheels or pulleys are subject to extraordinary duty or to the access of considerable quantities of dust and grit it may be found desirable to drill a supplementary supply oil-hole, $b'$, (shown in dotted lines in Fig. 1,) through the shell A, in line with the main supply-hole $b$, so that the holes may be readily cleared of any accumulation of dust, and a supply of oil additional to that furnished by the channels in the sleeve afforded to the shaft, as in the ordinary manner, thereby effectually guarding against any liability to insufficiency of supply, and meeting the requirements that may be imposed by excess of duty or unfavorable circumstances of location and surroundings.

The modification illustrated in Fig. 6 differs from the construction hereinbefore described only in the particular that the sleeve A is a plain cylinder upon its exterior, instead of being provided with longitudinal and transverse channels, which in this case are formed by partitions on the inner surface of the hub B, the relation of the channels to the hub, sleeve, and oil-holes being, however, identical in principle with that which exists in the use of the channeled hub first described.

It will be seen that in the operation of my improvements the lubricating material which is fed into the supply-holes is received in and distributed over a series of separate divisions or compartments, the arrangement of which is such as to effectually trap the oil and prevent its outward passage, under the influence of gravitation and centrifugal force, to the supply-opening, its natural tendency being to flow to and be received in each of said compartments by a fibrous or absorptive medium which conducts it to an opening leading to the shaft, and feeds it thereto in proportion as it may be required during the rotation of the pulley.

I claim as my invention and desire to secure by Letters Patent—

1. A cylindrical sleeve or bushing for loose wheels or pulleys having a central cylindrical bore suited to the shaft of the wheel or pulley, a series of longitudinal and transverse channels or passages upon its periphery, separated one from the other by partitions the diameter of which is uniform throughout and corresponds with the bore of the wheel or pulley, and an opening leading from one of said channels to the inner surface of the sleeve, substantially as and for the purpose set forth.

2. The combination of a loose wheel or pulley, a sleeve or bushing secured centrally therein, and a series of longitudinal and transverse channels or passages interposed between the hub of the wheel or pulley and the sleeve, and communicating at different points with openings in the hub and sleeve, respectively, substantially as set forth.

3. The combination of a loose wheel or pulley, a channeled sleeve or bushing secured centrally therein, and a wick or cord of fibrous or absorbent material inserted in said channels and leading to a radial opening formed in the sleeve, substantially as set forth.

L. R. FAUGHT.

Witnesses:
J. SNOWDEN BELL,
CHAS. MATHEWS, Jr.